Sept. 21, 1965      W. WALISCH ETAL      3,206,937
ARRANGEMENT FOR PRECISE CONTROL OF THE CONSTANT TEMPERATURE
OF A CIRCULATING LIQUID THERMOSTAT
Filed Nov. 22, 1963                         3 Sheets-Sheet 1

INVENTORS
WALTER WALISCH
FRIEDRICH BECKER

BY
*Burgess Dinklage & Sprung*
ATTORNEYS

INVENTORS
WALTER WALISCH
FRIEDRICH BECKER

INVENTORS
WALTER WALISCH
FRIEDRICH BECKER

United States Patent Office 3,206,937
Patented Sept. 21, 1965

3,206,937
ARRANGEMENT FOR PRECISE CONTROL OF THE CONSTANT TEMPERATURE OF A CIRCULATING LIQUID THERMOSTAT
Walter Walisch, Scheidt (Saar), and Friedrich Becker, Saarbrucken, Germany, assignors to B. Braun-Melsungen, Melsungen, Germany, a German corporation
Filed Nov. 22, 1963, Ser. No. 325,797
Claims priority, application Germany, Nov. 24, 1962, W 33,390
11 Claims. (Cl. 62—3)

The present invention relates to an arrangement for the precise control of the constant temperature of a circulating liquid thermostat, and more particularly to such an arrangement in which an energizable heat exchange means having one surface for direct contact with such circulating liquid for heat exchange therewith is provided to maintain within extremely narrow limits the deviation of the circulating liquid temperature from the desired set point temperature.

The usual circulating liquid thermostats possess certain disadvantages in view of the inherent limitations in the precision of their control for the following reasons:

(1) Contact thermometers used as temperature sensitive elements possess a response which is generally too slight and an insufficiently precisely defined switching point or set point.

(2) For control of the heating of the circulating liquid bath, immersion heaters presently used possess capacities of from 500–1500 watts and even higher which afford a rapid heating of the liquid bath, but due to the extremely high capacity of such heaters, and their considerable thermal inertia, the same are unsuitable for precise intermittent control of temperature.

(3) The very significant heat generated by stirring the circulating liquid bath must be dissipated and/or removed from the system in order to maintain even the most often encountered bath temperatures of for example 25° C., by means of a continuous flow of cooling liquid such as water, but the capacity of heat to be removed in this manner is inherently subject to great fluctuations. This is true not only because of the lack of uniformity of the temperature of the cooling liquid, such as water, but also the pressure thereof, factors for which compensation may only be made through the use of control heating systems having great capacity.

(4) Thorough mixing or stirring of the bath liquid frequently is insufficient to exclude or minimize disturbing temperature unevenness. Accordingly, a constant temperature even in the best commercial circulating liquid thermostats of better than ±0.01° C. cannot be attained. However, many measuring problems in physics and physical chemistry pursuits, of the type for example pertaining to calorimetry, thermometric titration, precise electrical conductivity measuremnts, dilatometry, require as a prerequisite an ambient temperature during the measurements which is constant and uniform within an error variation of about ±0.001° C.

Heretofore, various devices have been proposed for attaining the desired goal of uniformly maintaining the temperature in a particular system within a precise range of margin of error. The aforementioned drawbacks of immersion heaters, for example, may be avoided in this connection by using incandesecent lamps as heat regulators to control the temperature in a uniform manner. Nevertheless, this expedient does not comply generally in its practical execution with the prevailing safety regulations. Moreover, the high frequency switching attained in this regard in intermittent regulation or control is largely traceable to a thermal feedback. The result of this, however, is that the fundamental condition of uniformity between the bath temperature and the control temperature set point of the temperature sensitive element is no longer maintained as desired, inasmuch as all changes in the degree of feedback, influenced by light permeability of the bath and of the incandescent lamp, fluctuations in the circuit voltage, etc., affect undesirably the bath temperature. Therefore, if it is desired to obtain a temperature uniformity of ±0.001° C. with an arrangement of the aforementioned type, then a source of cooling liquid of small but constant flow rate and sufficient temperature uniformity must be used as well. This is preferably provided in the form of a stream of cooling water. While the constant flow rate of such a system may be readily attained using a cooling water manostat or similar device giving constant water pressure, the temperature uniformity thereof requires a pre-thermostat arrangement for the cooling water even at a small difference between the cooling water temperature and circulating liquid bath temperature, as for example would be the case where the cooling water is maintained at 15° C. and the bath at 25° C. Such an arrangement obviously is equal in its effect to a two-step thermostat arrangement, one for the cooling water and the other for the main liquid bath.

If a thermal feedback is not to be used within the temperature sensitive element it will only be able to respond quickly and in a reproducible manner to the temperature changes produced through the control heating, if as complete as possible a temperature equilization within the bath is assured by the stirring of the thermostat liquid. Of course this condition is particularly difficult to realize where comparatively larger pieces of apparatus, for example calorimeters, are disposed within the thermostat liquid bath. It is to be noted in this connection that in the usual stirring of thermostat baths dead corners of dead spaces are very easily formed as a result of whirling or eddy formation, which on account of their lability or changeability may cause sudden temperature fluctuations.

Another type of heat control arrangement is the multijacket thermostat in which two or more thermostat containers are nested in an insulated manner into each other. In this way a good temperature uniformity may be attained in the innermost thermostat container only if no energy conversions take place. Besides this, disadvantageously, a very long time is required for setting or adjusting the thermal equilibrium. Accordingly, such multijacket thermostats cannot be given serious consideration in practice for most of the aforementioned purposes.

In view of the low response of commercial contact thermometers, toluene-mercury thermo regulators have been used widely in the past as temperature sensitive recorders in precision thermostat arrangements. Nevertheless, due to the low heat conductivity of toluene and the comparatively great thermal inertia connected therewith, the theoretical response of devices of this type may not be utilized efficiently for regulating purposes. Moreover, this type of thermostat arrangement, unfortunately, requires a frequent cleaning of the switch contacts and has a deficiency in the prolonged uniformity of the control temperature.

Even so, a high response may be attained with favorable prolonged uniformity using thermo elements or resistance thermometers as temperature sensitive elements. Of course, the cost of the apparatus necessary for the temperature control is considerably increased with the use of these devices. In contrast to the contact thermometers or thermo regulators which only permit intermittance regulation or control, thermo elements and resistance thermometers make possible as well the continuous adjustment or control of the regulating capacity. In spite of the comparatively high cost for devices of this type, the regulating precision may only be properly improved through such a measure, where the aforementioned deficiencies in the heating, cooling and stirring of the usual thermostat liquid baths are simultaneously effectively removed.

It is an object of the present invention to overcome the foregoing drawbacks and disadvantages, and to provide an arrangement for the precise control of the constant temperature of a circulating liquid thermostat.

It is another object of the present invention to provide an arrangement of the foregoing type in which an energized heat exchange means having one surface for direct contact with such circulating liquid for heat exchange therewith is provided to maintain within extremely narrow limits the deviation of the circulating liquid temperature from the desired set point temperature.

It is still another object of the present invention to provide an arrangement of the foregoing type which utilizes an amount of energy as small as possible for maintaining the temperature of the liquid thermostat bath within the narrow limits of the set point.

It is a further object of the present invention to provide an arrangement of the foregoing type in which the stirring of the liquid thermostat bath is sufficiently intensive that the desired uniformity of temperature is assured within the entire bath at a given stirring capacity which is as small as possible under the circumstances.

It is a further object of the invention to provide a temperature sensitive element which possesses sufficient response to temperature change with very slight thermal inertia, and which is suitable for continuous control, in a one-step circulating liquid thermostat arrangement wherein rapid adjustment of the temperature equilibrium is maintainable.

It is a further object of the invention to accomplish the foregoing without error caused by thermal feedback between the temperature sensitive element and the heating and cooling means used to attain the precise temprature of the bath with respect to the set point temperature.

It is still another object of the invention to provide for the alternate heating and cooling with the same heat exchange means so as to avoid a most serious source of error as would be introduced with separate heating and cooling surfaces for the desired temperature regulation.

It is still another object of the invention to provide a control arrangement for precisely maintaining the circulating liquid thermostat with an improvement in the precision thereof of the order of about ten-fold over similar arrangements currently available.

It is another object of the invention to provide conveniently a highly sensitive mercury thermometer and a well stirred bath liquid to reduce error from these sources to a minimum.

It is still another object of the invention to maintain the circulating liquid thermostat at a very precisely constant temperature determined by a given set point value using a semi-conductor Peltier battery continuously controlled for alternately cooling and heating the liquid bath in dependence upon the direction of flow of energizing current therethrough.

Other and further objects of the invention will become apparent from the within specification and accompanying drawing, in which.

Figure 6:
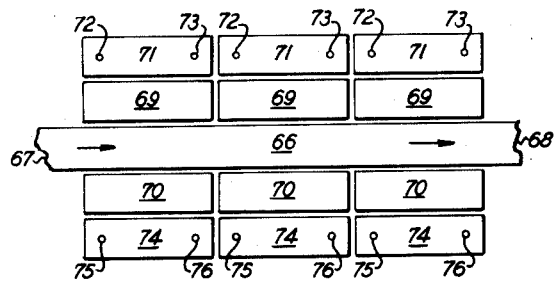
Figure 7:
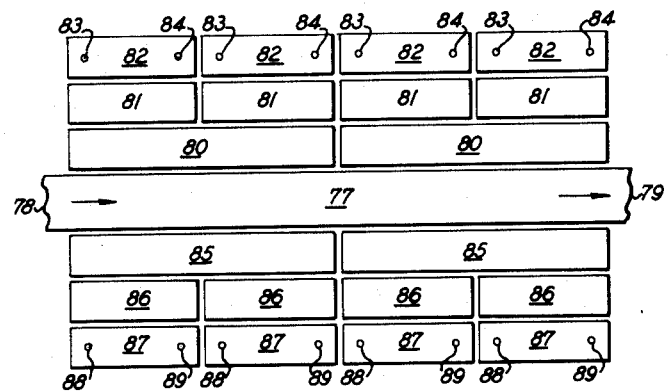

FIG. 6 is a schematic view of an aggregate of Peltier batteries used as heat exchange means for controlling precisely the temperature of a circulating liquid thermostat, the Peltier batteries being maintained on the side thereof remote from such circulating liquid thermostat in abutment with further heat exchange liquid; and FIG. 7 is a schematic view of an arrangement similar to that of FIG. 6, but in this case a cascade arrangement of Peltier batteries is employed.

It has been found in accordance with the present invention that an arrangement may be provided for the precise control of the constant temperature of a circulating liquid thermostat which comprises energizable circuit means including heat exchange means having a heat exchange surface for contact with such circulating liquid for heat exchange therewith when the heat exchange means are energized, a temperature sensitive element for sensing changes in temperature and having energizable energy regulator means for varying energy flow responsive to changes in temperature sensed, and energizable variable interval switch control means operatively coupled with the energy regulator means for controlling the supply of energy to energize the heat exchange means at variable intervals in dependence upon the varying energy flow of the energy regulator means.

More specifically, the precise control of a circulating liquid thermostat is effected with respect to a constant temperature set point and the heat exchange means are located in a first energizable circuit, such heat exchange means having an alternately heatable and coolable heat exchange surface for direct contact with the circulating liquid for heat exchange therewith when the heat exchange means are energized in said first circuit. The heat exchange means is operable within the range of the temperature set point and has an upper and lower temperature limit of extremely narrow deviation from such set point. Furthermore, a second energizable circuit is provided which includes a temperature sensitive element and variable interval electronic switch control means, the temperature sensitive element having energy regulator means therein for varying energy flow through the second circuit responsive to changes in temperature sensed. The switch control means is connected with the energy regulator means in the second circuit yet operatively coupled with the heat exchange means in the first circuit for actuation to control the supply of energy in the first circuit to energize the heat exchange means at variable intervals in dependence upon the varying energy flow of the energy regulator means for alternately heating and cooling the heat exchange means whereby to maintain the circulating liquid precisely at the set point temperature.

As heat exchange means, significantly a semi-conductor Peltier battery is employed together with energizable relay means for switching alternately the direction of current supply to the battery for variable intervals in dependence upon the actuation of the switch control means for heating and cooling alternately within the desired temperature limit during the variable intervals respectively the heat exchange surface and in turn the circulating liquid of the thermostat.

The switching control means includes preferably a multivibrator, which may have an approximately constant frequency so that the same will perform the role of an electronic switch. The energy regulator means, on the other hand, may comprise a photo-resistor, sensitive to light changes, which is in the second circuit with the multivibrator and operatively connected with the control grid means of the multi-vibrator to vary the potential of such grid means and, in turn, the intervals of actuation of the switch control means in dependence upon the temperature sensed. In this way the energizing of the relay means for switching the direction of current to the Peltier battery may be controlled for substantially continuous control in turn of the temperature difference between the circulating liquid and the heat exchange surface of the heat exchange means.

In accordance with one embodiment of the invention the temperature sensitive element includes a thermometer, perhaps of the usual glass type, through which a beam of light is passable, and which contains a capillary filled with mercury. Furthermore, a light beam source is included on one side of the mercury capillary, positioned with respect to the photo-resistor such that the mercury capillary is directly in the light path therebetween. In this manner, a light beam may be cast or projected onto the photo-resistor which varies in intensity in dependence upon the height of the mercury in the capillary and, in turn, the degree of occlusion of such light beam by the mercury.

As to the semi-conductor Peltier battery, in accordance with one embodiment of the invention, a circuit arrangement is used in which direct current passes therethrough for cooling the heat exchange surface thereof, and in which alternating current is passed therethrough for heating such heat exchange surface. Conveniently, the ratio of heating and cooling during each interval of the multivibrator frequency is directly dependent upon the light beam intensity. Actually, the heat exchange surface may represent one of the sides of the semi-conductor Peltier battery which is in contact with the circulating liquid, while the other of the sides of such battery is insulated from the circulating liquid and maintained at an approximately constant temperature by contact with a separate circulating fluid of constant temperature.

Generally, precise temperature control is possible only in a single step circulating liquid thermostat in which repeated adjustment of the temperature equilibrium is possible, so long as the capacity turnover or heat changing is maintained as small as possible, while avoiding any passage or dissipation of energy between the heating and cooling surface means via the circulating liquid bath. Also, the stirring must be so intensive that the temperature within the entire bath will remain sufficiently uniform, keeping in mind the desire to employ a stirrer having as small as possible a stirring capacity. Of course, the temperature sensitive element must possess sufficient response at low thermal inertia and, advantageously, should be relatively inexpensive, all things considered. Finally, thermal feedback between the temperature sensitive element and the heating and/or cooling element must be avoided to achieve the degree of preciseness of the arrangement. All of these factors have been considered in the development of the present invention and it will be clear that the instant arrangement represents a most advantageous and versatile fulfillment of the desired requirements and avoidance of the undesirable factors.

Specifically, a semi-conductor Peltier battery, is used having sufficient dimensions and charatceristics for heating and cooling a particular size bath, such battery being operated by a simple reversal of the polarity of the operating current to effect the functions of heating and cooling simultaneously in one and the same element. Thus the supply and removal of heat as needed to maintain the temperature of the bath precisely constant occurs for the most part within the single heat exchange surface so that dissipation or passage of the uniformly distributed heat generated by the stirring or circulating of the bath liquid need only be accommodated. Because of such decrease in the passage of energy from the bath occasioned by the use of a single heat exchange surface for both heating and cooling the bath, a stirrer of smaller capacity need be employed to circulate the liquid which, in turn, will generate a correspondingly smaller amount of heat to be disposed of within the system. Inasmuch as the heating and cooling of the liquid bath for the desired temperature control are both regulated precisely and rapidly at one surface and do not dissipate to the bath uncontrollably through inertia to effect adversely the temperature uniformity of such bath, a much more accurate system of temperature control is possible. Advantageously, by using the instant arrangement the control of the heating and cooling of the semi-conductor Peltier battery may be carried out in a more or less continuous manner so as to avoid periodic temperature fluctuations which would otherwise occur with comparatively long time interval intermittent control. The heat exchange surface acquires an almost constant median temperature, which because of the need for dissipating the heat generated by the stirring or circulating of the liquid bath, must be located somewhat below the bath temperature set point so as to offset the generated stirring heat. The constant median temperature of the heat exchange surface is provided for effecive operation because the operating current of the battery may be periodically reversed, for example by the multi-vibrator, at a fixed and sufficiently high frequency switching interval, the ratio of the time of current energization of the heating current and alternately of the cooling current during each switching period being continuously regulated, for example by the photo-resistor, in dependence upon the temperature sensed. Indeed, due to the desirable heat capacity of the heating and cooling surface of the battery, sufficient control may be obtained even with a switching frequency of about 0.5 cycle per second, which generally corresponds to a truly continuous regulation or control considering the environment and system involved.

The periodical reversal of the operating current for the Peltier battery, necessary for the desired constant temperature maintenance, is very simply effected for example by means of a relay arranged to change the polarity of the current passing to the battery. Such relay may take the form of an energizable relay having a coil to throw the relay switch from rest position to active position upon receiving periodic current impulses from the multivibrator, which, as aforesaid, is operatively coupled through such coil with the circuit of the Peltier battery for the desired control. The duration of each current impulse, of course, changes continuously in the true sense as changes in temperature are recorded by the temperature sensitive element through the photo-resistor, which, in turn, influences the potential of the control grid in a vacuum tube multi-vribator or the base current of a transistor-multi-vibrator. The temperature sensitive element must provide a signal in the vicinity of the set point which is transformable with changes in temperature into a continuously changeable electric potential. This may be simply achieved in accordance with a preferred embodiment of the invention as aforesaid by an arrangement in which changes in the height of the meniscus of a normal mercury filled thermometer are transformed by photoelectric means, i.e., a photo-rsistor into voltage changes. Since thermometers of low thermal inertia are available readily for any particular temperature range desired, the temperature control in the instant case is possible with a minimum of expense in this regard and with an effect which is practically continuous within the range of temperature in question. Officially calibrated thermometers are, therefore, conveniently useable in the temperature sensitive element of the invention so that the absolute value of the control temperature may be precisely sandardized or predetermined without need for additional auxiliary equipment.

Figure 1:
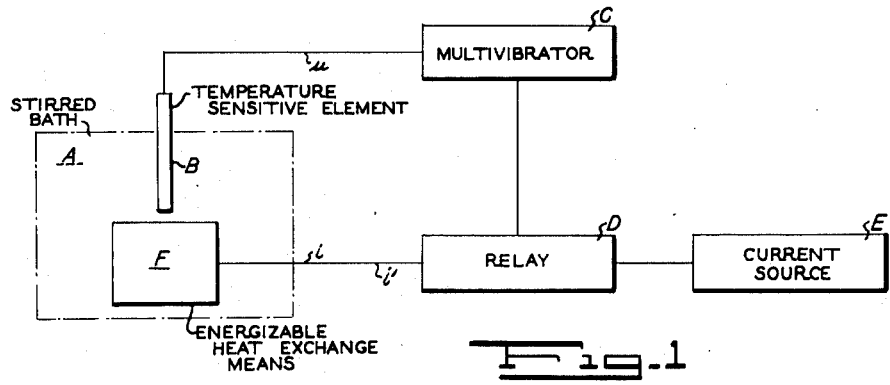
FIG. 1 represents schematically by block diagram an arrangement for maintaining precisely constant the temperature of the bath of a circulating liquid thermostat in accordance with the present invention showing the positioning of the temperature sensitive element and the heat exchange means (semi-conductor Peltier battery)

Referring to FIG. 1, an arrangement representing the fundamental principles of operation of the present invention is shown. Into the stirred bath A of the circulating liquid thermostat as might be contemplated by a Warburg arrangement, a temperature sensitive element B is immersed as well as an energizable heat exchange means, for example a semi-conductor Peltier battery F. The voltage $u$, developed in consequence of the temperature sensed by the temperature sensitive element possesses in the vicinity of the set point temperature a very steep approximately linear dependence on the temperature. Thus, a voltage $u_0$ corresponds to the set point $T_0$ of the bath temperature T. The voltage $u$, or more specifically the change in potential caused by changes in the resistance of the energy regulator means or photo-resistor is conducted to the variable interval electronic switch control means, such as the multi-vibrator C, which produces periodical current impulses of variable duration $t$ at the control coil of the pole-changing relay D, during which time the working contacts of the relay D are switched on. Through these working contacts a cooling current $i$ flows through the Peltier battery F, such current being furnished by a current source or feeding device E. On the other hand, when the relay switch D is in rest postion, a heating current $i'$ flows via the rest contacts thereof from the Peltier battery F. The currents $i$ and $i'$ are so chosen that where $T=T_0$ the impulse duration $t$ is about equal to half the multi-vibrator period $t_0$. Thus, the Peltier battery under these conditions gives off on the average a cooling quantity or actually removes a heat quantity from the bath which just compensates for the heat generated in the bath by the stirring or circulating of the liquid therein. If T is greater than $T_0$ then $t$ becomes greater than $t_0/2$, and the median cooling capacity of the Peltier battery increases. On the other hand, if T is less than $T_0$, then $t$ becomes less than $t_0/2$, and the cooling capacity of the Peltier battery decreases, or may even change on the average to a heating capacity.

Figure 3:
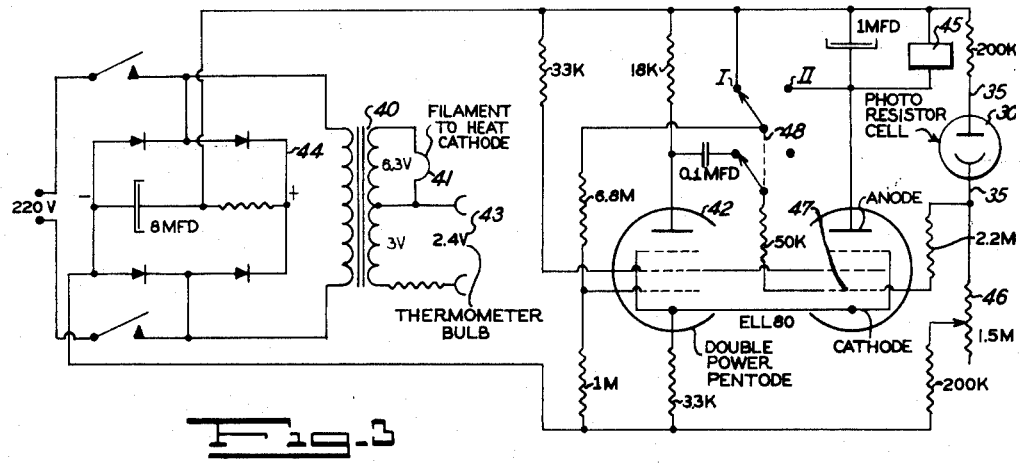
FIG. 3 is a schematic view of circuit means for operating the supply of current to the heat exchange means for alternately heating and cooling the same, an electronic switching arrangement as well as a photo-resistor being provided for this purpose.
Figure 4:
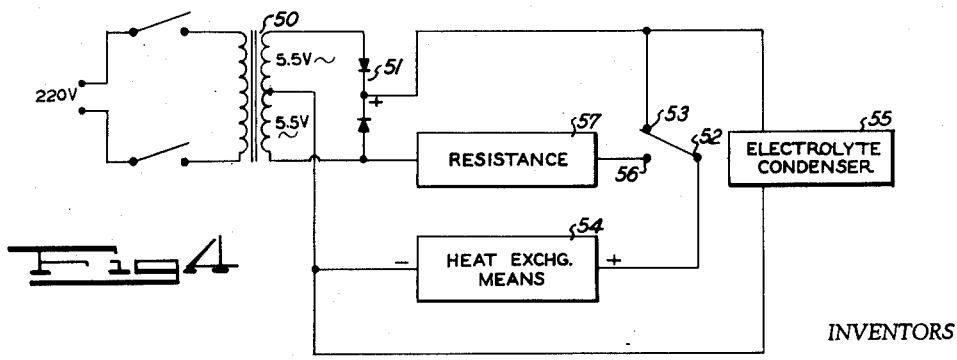
FIG. 4 is a schematic view of a circuit for energizing specifically the heat exchange means (semi-conductor Peltier battery) with current flow for either cooling or heating depending upon a relay switch controlled by the circuit of FIG. 3.
Figure 2:
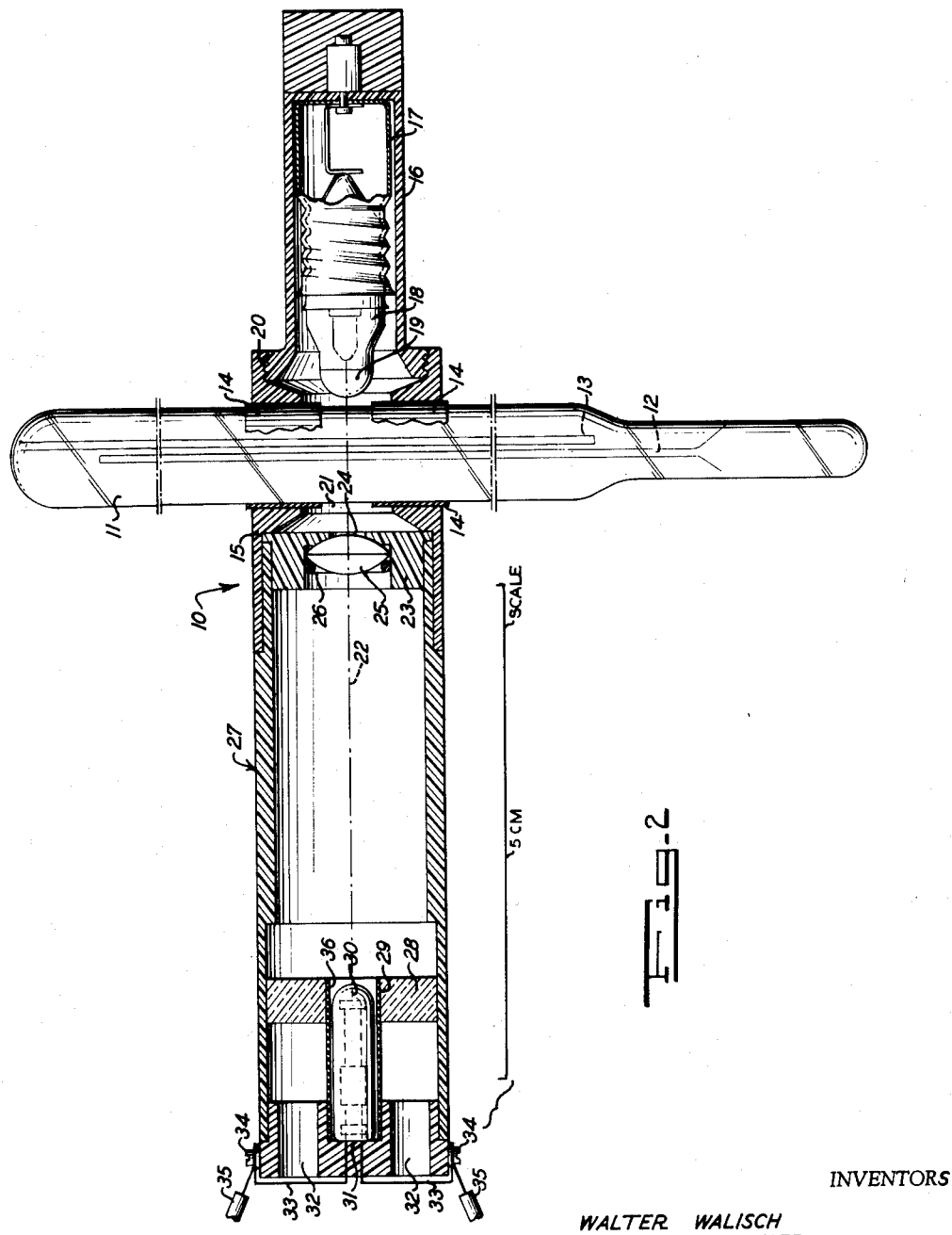
FIG. 2 is a schematic view, partially in section and with parts condensed, of a temperature sensitive element arrangement in accordance with the invention.

The arrangement fundamentally shown in FIG. 1 is explained in greater detail with respect to FIGS. 2, 3 and 4. For this purpose, the usual thermostat container is provided which consists of a thermally well insulated cylindrical vessel of about 10 liters content, which is maintained upright with its axis vertically disposed. The upper end is closed by means of a pair of semi-circular lid portions which are well insulated. One cover half or lid portion is fixedly attached across half of the opening at the upper end of the cylindrical vessel and contains mounted thereon a rotary pump with its attendant motor, the temperature sensitive element of the invention, and an auxiliary heater. The other cover half or lid portion is removably disposed across the remaining open part of the upper end of the vessel to close the same in the desired manner, yet permit access to the vessel interior when desired. A centrifugal pump with a directly coupled drive motor of 1400 r.p.m. and a mechanical stirring capacity of 10 watts, is used as the centrifugal pump for maintaining the liquid of the bath in a circulating condition. The pump is immersed half way near the edge of the bath into the liquid with the tangentially outlet opening of the pump being so directed that a strong horizontal rotation of the entire bath liquid results. The central section openings of the pump are in turn directed upwardly and downwardly with respect to the positioning of the pump in the bath so that also a constant thorough mixing of the bath occurs in vertical direction. A second outlet opening of the pump, conducted through the fixed half of the thermostat cover or lid portion, permits connection with an outer cycle or circulation in the usual manner. As sensitive control measurements with a thermistor (semiconductor element with negative temperature coefficient-NTC element) developed as measuring instrument have shown, temperature fluctuations of the bath under these conditions are not greater than $\pm 3.10^{-4}$° C. The auxiliary heater takes the form of an immersion heater of 1000 watts capacity, which serves for the rapid preheating of the thermostat bath initially.

The tubular housing 10 shown in FIG. 2 represents a temperature sensitive element which includes a thermometer 11 of the usual type containing a mercury capillary 12 and a graduated scale 13, thermometer 11 being displaceably situated by means of a flexible clamping sleeve 14 within an opening in the theromometer holder 15. Advantageously, the scale 13 is graduated in increments of 0.1° C. with a scale length of about 5 mm. per degree. The thermometer 11 is made from glass or other suitable material which permits light to pass therethrough for cooperation of the thermometer with the optical control arrangement in the temperature sensitive element. Specifically, a bulb holder 16 containing a socket 17 carrying a light bulb 18 having a condenser lens (19) at the end thereof, is threaded at 20 on to the corresponding end of the holder 15. This permits a light beam to pass through the slit 21 defined by the inward end portions of the clamping sleeves 14 along the optical axis 22 illustrated schematically in dotted line. On the opposite side of the thermometer from that of bulb holder 16, a socket ring 23 is disposed within holder 15, such socket ring having a central reduced diameter apperture 24 in alignment with the optical axis 22. A biconvex lens 25 is received within socket ring 23 and maintained in fixed position therewithin by retaining ring 26, such that the bulb lens 19 and the collecting lens 25 are in proper axial alignment with respect to the optical axis 22 for passing the light beam from the bulb 18 through this optical lens system and through a portion of the thermometer for registering an image of the scale 13 and the height of the mercury in the capillary 12 upon a focusing screen 28, for example a ground glass screen. The screen 28 is maintained in an elongated tube 27, one end of which is inserted into the corresponding end of thermometer holder 15 in a manner serving to retain in fixed position the socket ring 23 thereat. A central opening 29 is provided in the screen 28 in line with the optical axis 22 so that the corresponding end of the photo element, i.e., cadmium sulfide photo resistor 30 may be situated conveniently therein in the path of the light beam from bulb 18 extending along the optical axis 22. The photo resistor 30 is disposed in a socket 31 at the opposite end of tube 27, such socket being provided with observation windows 32 for viewing the image of the thermometer portion in question which is projected by the light beam and lens system upon the screen 28. Suitable leads 33 are provided for connecting photo resistor 30 via the taps 34 with the circuit 35 of a control switch means more clearly shown in FIG. 3.

The bulb 18 may take the form of a small lens-incandescent bulb (3.7 volts, 0.3 amps), so that intensive illumination from behind the thermometer in the vicinity of the temperature set point may be achieved, whereby with the aid of the condensing lens 25 the scale 13 of the thermometer 11 will be projected in the desired manner. In this connection, only that portion of the scale and the capillary mercury of the thermometer in the vicinity of the set point or predetermined constant temperature point of the circulating liquid thermostat is situated at the slit 21 in line with the optical axis 22. Under the aforementioned conditions, the ratio of light intensity and electrical capacity is very favorable and errors caused by the heating up of the mercury thread in the capillary remain negligible.

Of course, where the predetermined set point is to be changed, the thermometer may be merely vertically displaced in the clamping sleeves 14 to bring that portion of the scale 13 corresponding to the new set point within the range of the optical axis 22. For achieving a precise adjustment of the thermometer scale portion in question with respect to the optical axis, an adjusting screw (not shown) may be provided on the holder 15 at the clamping sleeves 14.

A bi-convex collecting lens 25 having a focal length of about 8 mm. and a diameter of about 9 mm. may be used with the incandescent lamp as the optical system, the sharpness of the image projected onto screen 28 being improved by peripherally reducing the diameter of the lens to 4 mm. by the peripherally enclosing portions of the socket ring 23 providing the apperture 24. Not only may the axial position of lens 19 be adjusted via the threads 20, but also the axial position of the collecting lens 25 may be adjusted by the axial telescoping position of the corresponding end portion of elongated tube 27 with respect to the thermometer holder. 15. Accordingly, lens 19 and lens 25 may both be adjusted with respect to the mercury capillary and temperature scale of the thermometer for insuring the sharpness of the image to be projected. Actually, an enlarged real image will appear on the screen corresponding to the vicinity of the set point temperature at which the capillary and the mercury meniscus are situated.

In this embodiment, the cadmium sulfide photo resistor is a Valvo Orp 60, made by the Valvo firm, located in Hamburg, Germany, this element having a light sensitive surface of 0.25 mm.$^2$. In the arrangement shown, in order to protect this light sensitive photo resistor from disturbing alien or extrinsic light, a hard rubber sleeve 36 is provided which encloses the photo resistor 30, except for the front end thereof situated in the opening 29 of the screen 28. In this regard, considering the dimensions of the photo resistor, the opening 29 in the screen 28, and correspondingly the opening in the end of the rubber sleeve 36 is about 0.5 mm. in diameter.

In the arrangement shown in FIG. 2, an approximately four power enlargement is achieved, i.e., the image of the capillary and mercury thread is projected onto the screen and onto the appropriate end of the photo resistor in an image which is four times larger than the actual dimensions. Advantageously, by precisely adjusting the optical system including the lenses and the thermometer, the opening 29 may be completely covered by the image of the mercury thread, so that changes in the height thereof in the vicinity of the set point temperature will cause correspondingly great changes in the resistance of the cadmium sulfied cell.

In the relay arrangement of FIG. 3 in accordance with the invention, intermittent as well as continuous control of the relay coil operating the switching means for directing the supply of current to the heat exchange means, e.g., semi-conductor Peltier battery, is provided. It will be seen that the photo resistor 30 is situated via the circuit portion 35 in a circuit with an electronic switching means. The photoresistor is positioned in series with two protective resistances, for example, 200 kilo-ohm resistances, as well as a potentiometer (for example 1.5 megohm) at a direct current voltage of about 250 volts, the potentiometer serving for the final adjustment of the working point of the arrangement.

The line current is 220 volts and a portion is passed to the transformer 40 for supplying a comparatively high voltage (6.3 volts) for indirectly heating the cathode shown schematically at 41 of a double power pentode illustrated at 42, and for supplying a comparatively low voltage (3 volts) for energizing the thermometer bulb schematically shown at 43 in line with the resistor of 5 ohms, whereby a resultant voltage of 2.4 volts is attained. The line current is also passed to a rectifier arrangement 44 containing a condenser (8 microfarads) and a resistor (0.4 kilo-ohm) for changing the alternating current to direct current for energizing the double power pentode arrangement. The double power pentode 42 is commercially identified as an ELL 80 double power pentode which is situated in the circuit with the various resistors and condensors shown so as to form a multi-vibrator or electronic switch to impart impulses at a given frequency for energizing the coil of the relay 45 which stands in the circuit for supplying current to energize the heat exchange means, i.e., the semi-conductor Peltier battery. The multi-vibrator arrangement works in the position I of the double pole switch 48 in the desired manner, but when the switch is in position II, the circuit operates in a different way. Where the multi-vibrator switch position I is used, the cadmium sulfide photo resistor 30, depending upon the light intensity sensed thereby, will vary its resistance in the circuit and thus influence the potential of the control grid 47 of the pentode. The potentiometer 46 will determine by proper adjustment thereof the influence of the photo resistor 30 on the control grid 47. In position II, however, the vibrator arrangement has the function of a very sensitive electronic relay with intermittent operation.

Assuming the temperature of the circulating liquid thermostat bath is on the high side with respect to the predetermined temperature set point, the mercury thread will cover completely the light beam from the bulb (see FIG. 2) such that substantially no light will register upon the photo resistor to change the same. In this case, a dark current $i_d$ of about 15 microamperes will flow through the photo resistor in the circuit of FIG. 3. If the bath temperature decreases, the mercury thread will fall in the thermometer such that the meniscus thereof will permit light to pass from the light bulb and register upon the cadmium sufide cell of the photo resistor. At full light intensity, the photo current $i$ of the photo resistor will increase to a maximum bright current $i_h$ of about 90 micro-amperes. By means of the potentiometer 46, the working point is thus adjusted that the photo current $i_s$ at the set point temperature is equal to 0.5 $(i_d+i_h)$. In the vicinity of this point the photo current changes with the position of the mercury meniscus practically linearly and with maximum steepness, for example about 1 ma./mm., with reference to the meniscus itself and not the projected image thereof. It will be realized, therefore, that where little or no light registers upon the photo resistor, such photo resistor will possess high resistance and low current, indicating the bath is at a higher temperature than the set point. On the other hand, where a large amount of light or high intensity of light beam registers upon the photo resistor, such photo resistor will possess a low resistance and high current, indicating that the bath temperature is less than the set point temperature.

By reason of the circuit arrangement provided when the double pole circuit changing switch 48 is in position I, a cathode coupled multi-vibrator having a frequency of about 0.5 cycles per second will be provided, if the photo current is in the continuous regulating range or interval $i_s-\gamma \leq i \leq i_s+\gamma$ wherein $\gamma$ is about 10 microamperes. Beyond this range there will be heating or cooling of the bath depending upon which side of the range the photo current is registered.

The control coil of the relay 45 is disposed in a sub-circuit with one anode of the double power pentode 42 (ELL 80) and receives current impulses at the multi-vibrator frequency, the duration $t$ of which increases in the frequency interval about linearly with the photo current $i$, whereby in all an increase of approximately ten fold is obtained. Outside of this interval of the multi-vibrator frequency, the control coil of the relay 45 is either without current or is energized by a permanent or steady current. The significant factor is that the energy disposition of the control coil is varied during the time when the multi-vibrator operates to impart current impulses for energizing the relay coil to switch the position or direction of the current supply to the heat exchange means or Peltier battery in connection with which the circuit is used.

In position II of the double pole switch 48, the relay 45 merely serves for the intermittent control of the current supply to the heat exchange means within a very small switching range, for example about $i_s$ plus or minus 2 micro-amperes. In this instance, changes in temperature which in turn produce changes in light intensity upon the photo resistor will cause changes in the current to the relay coil by which the relay contacts are operated, yet without the switching period of the multi-vibrator which only gives a substantially continuous regulation.

In connection with FIG. 4, a circuit arrangement is shown which is fed by a line current of 220 volts via a transformer 50. A portion of the current is rectified at 51 for passage through the working contact 53 of the coil operated relay switch 52 to energize the heat exchange means (semi-conductor Peltier battery 54) with direct current for achieving a cooling effect. The relay switch 52 is energized to the working position 53 in accordance with the circuit arrangement of FIG. 3, as for example where the double pole switch 48 is at position I. In order to screen the circuit and even out current fluctuations or surges, an electrolyte condenser 55 is situated in the circuit. Where the switch 52 returns to rest position 56, on the other hand, alternating current from the transformer 50 will flow through the circuit including the resistance 57 to provide for the heating of the heat exchange means 54.

In the embodiment shown in the arrangement of FIG. 4, as heat exchange means or heating-cooling element, a semi-conductor Peltier battery is employed, for example, with 3 Valvo Peltier batteries PT20/20 connected one behind another, to attain a cooling capacity of about 30 watts at a cooling current of 10 amperes and a temperature difference of about 15° C. between the hot and the cold sides of the device. At the hot side of the Peltier battery, cooling ribs are provided which are continuously cooled by an air blower. At the cold side a circulating water arrangement is mounted, which is thermally insulated from the exterior and connected via short, insulated hose lines to the outer circulation system of the centrifugal pump of the circulating liquid thermostat in which the temperature sensitive element described hereinabove is situated. In the circuit shown in FIG. 4, the transformer 40 provides at the secondary winding under a load of 10 amperes, two 5.5 v. alternating current voltages for feeding the rectifier 51 arranged in center point switching. The rectifier arrangement, for example, may include three parallel connected silicon-capacity-rectifiers produced by the firm of Intermetall (Germany) type OY 5061. The condenser 55, in this connection, is provided with a capacity of 50,000 microfarads for decreasing the fluctuations to about 5% at 10 amperes. When the switch 52 is in the rest position 56, the Peltier battery 54 is supplied via the resistance 57 of about 0.8 ohm, with an alternating current of about 5 amperes. Under these conditions, in continuous operation, at a thermostat temperature of 25° C. a temperature of about 37° C. sets in at the air cooled hot side of the Peltier battery. The cooling capacity at 10 amperes direct current amounts to about 30 watts, while the heating capacity at 5 amperes alternating current amounts to about 10 watts, so that with respect to a permanent stirring capacity of 10 watts in the circulating liquid thermostat, equally long heating and cooling times will result, i.e., $t=0.5\ t_0$.

With the foregoing arrangement of FIG. 4, operatively coupled with the arrangement of FIG. 3 and that of FIG. 2 for changing the switch 52, a constant and uniform temperature within the precise limits of ±0.0008° C. may be attained, which corresponds to the response performance of the temperature sensitive element over a prolonged period of time. With the intermittent control provided when the arrangement of FIG. 3 is used with the double pole switch 48 in position II, period temperature fluctuations of ±0.008° C. will occur around a constant median value of ±0.0008° C.

Another form of execution of the control device in accordance with the invention, contemplates the use of a water cooled Peltier battery, having its heating-cooling surface immersed directly into the thermostat bath, for example at 25° C., whereas the hot side thereof is in flow contact with a cooling water stream, for example, at 15° C., such cooling stream being thermally insulated from the thermostat bath. Because of the low temperature of the hot side, the necessary cold capacity is attained in this case (for example 30 watts as noted above) even with a smaller Peltier battery such as a 1 Valvo Peltier battery PT 20/20 with 12 amperes cooling current. For the feeding of the Peltier battery in the cooling and heating phases a carefully screened direct current is employed in order to change the polarity via the double-pole pole-reversal relay.

In accordance with another embodiment of the invention, the regulating of the thermostat is carried out with a Peltier battery equipped with two water circulating arrangements, using for example a 1 Siemens Sirigor cooling element 18/5, type 02B. One liquid circulating system is flushed with cooling water at for example 15° C., whereas the other is connected by means of thermally insulated hoses, at the outer circulating system of the centrifugal pump of the thermostat, for example maintained at 25° C.

The last two above-mentioned embodiments may also be used to control low temperatures (cold thermostats), in which case in the place of the cooling water, a cooling liquid of sufficiently low temperature, furnished by a refrigeration machine, is employed.

In still another form of the invention, a cold thermostat for low temperature regulation may be employed which consists in the sole use of semi-conductor Peltier batteries for generating cooling capacity. Since the cooling capacity of each Peltier battery strongly declines with too great a temperature difference between the hot and cold sides, a cascade arrangement is employed including two or more sufficiently dimensioned Peltier batteries, which possess on both sides liquid circulating arrangements of the foregoing type. In each individual step of the cascade, the cooling amounts for example to 15° C. While the hot side of the first step is cooled using tap water at 15° C. for example, the cold side thereof at for example 0° C. feeds the circulating system of the hot side of the second stp, etc. The capacity given off to the thermostat liquid by the heating-cooling surface of the last step, is continuously regulated in the foregoing manner in accordance with the invention as described hereinabove.

The control achievable in accordance with the invention may also be carried out, if in place of the above-described optical control system and mercury thermometer, other temperature sensitive elements are used, provided they fulfil the conditions desired herein. Other temperature sensitive elements in this regard include resistance thermometers, thermistors (semi-conductor elements with negative temperature coefficients) in bridge-connection, or thermo elements. In these cases, as a rule, a pre-amplification of the signal given off by the temperature sensitive element is necessary.

In still another form of the present invention, the required control capacity is influenced such that the multi-vibrator determines, through periodic activation of magnetic valves, the median flow velocity of a heating and/or a cooling liquid in the true sense. This heating and/or cooling liquid may be situated in connection with the thermostat bath, either via an indirect heat exchange means or in a direct manner. In place of the heating liquid, an electrical heating element may be used for the heating of the thermostat.

Accordingly, it is an advantage of the present invention to provide a control which is truly continuous in its effect, the same being attained with a very low expenditure in equipment, energy requirements, etc. Besides, by the avoidance of separate heating and cooling surfaces and the energy dissipation within the circulating liquid bath connected therewith, one of the most serious sources of error of customary control devices for circulating liquid thermostats is removed. With approximately the same expenditure, the present invention provides an improvement in the control precision of circulating liquid thermostats by a power of at least 10 with respect to customarily employed arrangements. Therefore, almost boundless possibilities exist for precise temperature control in accordance with the present invention, as compared with those using the usual intermittent processes. Accordingly, one may, for example, very simply improve in a considerable manner, the control precision indicated hereinabove, such that a more sensitive mercury thermometer is used in the temperature-sensitive element and such that the circulating liquid bath is maintained more uniform in the heat dissipation therethrough and in the temperature thereof.

In all cases in which is mentioned a mercury thermometer, any type of liquid-in-glass thermometer, filled with a light-absorbing liquid, e.g., alcohol, pentane, toluene, is applicable, as well as any temperature sensitive element, which is adapted for continuous control, e.g., resistance thermometers, thermistors and thermocouples.

The term photo-resistor in the foregoing means photoconductive cell.

Figure 5:
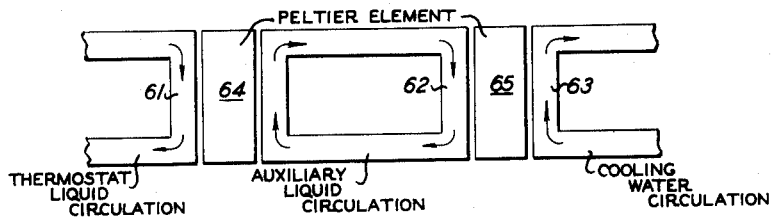
FIG. 5 is a schematic view of a cascade arrangement in which the heat exchange means (semi-conductor Peltier elements) in cascade are separated by circulating liquid baths for attaining the desired temperature control of the circulating liquid thermostat.

In accordance with the foregoing, FIG. 5 shows a cascade arrangement of Peltier elements in which the Peltier element 64 is situated with its cold side adjacent the thermostat liquid circulation 61 and with its hot side adjacent the auxiliary liquid circulation 62, the Peltier element 65 in turn having its cold side adjacent such liquid auxiliary circulation 62 and its hot side adjacent the cooling water circulation 63. In this way the desired effect is achieved for attaining low temperatures of the thermostat liquid circulation with great efficiency.

Furthermore, in FIG. 6 a cooling aggregate arrangement is shown for the circulating liquid thermostat. A flat conduit 66, for example made of copper plate, serves as heat exchanger wall between the Peltier batteries and the circulating liquid which enters at 67 and is discharged at 68 for passage to a rotary pump of the thermostat bath for recirculation and reintroduction at 67. The Peltier batteries 69 and 70 are disposed with their corresponding cold sides adjacent the conduit 66 and with their corresponding warm sides adjacent the cooling water circulation elements 71 and 74, as the case may be. For the cooling water elements 71, inlets 72 and outlets 73 are provided whereas for the cooling water elements 74, the inlets 76 and the outlets 75 are provided. The cooling water circulating through the elements 71 and 74 via the corresponding inlets and outlets serves to remove heat from the system in the desired manner.

In FIG. 7, a cooling aggregate is shown similar to that in FIG. 6 but with the Peltier batteries in cascade arrangement. In this regard a circulating liquid thermostat arrangement is shown in which the circulating liquid passes through a flat conduit 77 at inlet 78 and is discharged at outlet 79 for recirculation by way of a rotary pump for the thermostat bath, in a similar way to the circulating arrangement of FIG. 6. The cold sides of the Peltier batteries 80 and 85 are positioned adjacent the circulating liquid within conduit 77 and the warm sides of such batteries are correspondingly positioned adjacent the cold sides of the Peltier batteries 81 and 86, as the case may be. In turn, the warm sides of the Peltier batteries 81 and 86 are adjacent the cooling elements 82 and 87, respectively. The cooling elements 82 are provided with inlets 83 and outlets 84, whereas the cooling elements 87 are provided with inlets 89 and outlets 88, such inlets and outlets being provided for passage of circulating cooling liquid, such as water, through the cooling elements for the desired purposes. Twice as many Peltier batteries 81 are present as the number of Peltier batteries 80, and the same is true with respect to the Peltier batteries 86 as compared with the number of Peltier batteries 85. The Peltier current for both cascade steps is controlled in accordance with the present invention as described hereinabove. The Peltier batteries 80, 80 and 85, 85 contain the same number of Peltier elements as are present in all of the Peltier batteries 81 and in all of the Peltier batteries 86, respectively. It will be realized that the warm sides of the corresponding Peltier batteries 80, 85 are actually positioned in direct thermistor-contact with the corresponding cold sides of the Peltier batteries 81, 86, respectively.

What is claimed is:

1. Arrangement for the precise control of the constant temperature set point of a circulating liquid thermostat which comprises a first energizable circuit including an energizable heat exchange means having a single alternately heatable and coolable heat exchange surface for direct contact with such circulating liquid for heat exchange therewith when said heat exchange means are energized, said heat exchange means being operable within the range of such temperature set point and having a temperture varying continuously between an upper and lower temperature limit of extremely narrow devitation from such set point, and a second energizable circuit including a temperature sensitive element for sensing changes in temperature of the circulating liquid of such thermostat and having energy regulator means therein for varying energy flow through said second circuit responsive to changes in temperature sensed and variable interval electronic switch control means operatively connected in said second circuit with said energy regulator means and operatively coupled with said heat exchange means for actuation to control the supply of energy in said first circuit to energize said heat exchange means at variable intervals in dependence upon the varying energy flow of said energy regulator means for alternately heating and cooling said heat exchange means to maintain the circulating liquid precisely at the set point temperature the ratio of heating and cooling being variable during each actuation interval in dependence upon the varying energy flow of said energy regulator means.

2. Arrangement according to claim 1 wherein said heat exchange means includes a semi-conductor Peltier battery and energizable relay means for switching alternately the direction of current supply to said battery for variable intervals in dependence upon the actuation of said variable interval switch control means to heat and cool alternately within said temperature limit during said variable intervals respectively said heat exchange surface and in turn the circulating liquid of the thermostat.

3. Arrangement according to claim 2 wherein said switch control means includes a multivibrator of approximately constant frequency having control grid means in said second circuit and said energy regulator means of said temperature sensitive element includes a photoresistor connected in said second circuit means operatively with said control grid means to vary the potential thereof and in turn the intervals of actuation of the switch control means in dependence upon the temperature sensed by said temperature sensitive element for controlling the energizing of said relay means for switching the direction of current to said battery for substantially continuous control of the temperature difference between such circulating liquid and said heat exchange surface.

4. Arrangement according to claim 3 wherein said temperature sensitive element includes a liquid-in-glass thermometer through which a beam of light is passable and containing a capillary filled with light-absorbing liquid, and a light beam source on one side of the light-absorbing liquid capillary positioned with respect to said photoresistor such that said light-absorbing liquid capillary is directly in the light path therebetween for casting onto said photo-resistor a light beam which varies in intensity in dependence upon the height of said light-absorbing liquid in said capillary and in turn the degree of occlusion of such light beam by said light-absorbing liquid.

5. Arrangement according to claim 4 wherein said Peltier battery is provided with direct current for cooling and with alternating current for heating said heat exchange surface, and the ratio of heating and cooling during each interval of the multivibrator frequency is directly dependent upon the light beam intensity.

6. Arrangement according to claim 5 wherein said heat exchange surface is defined by one of the sides of the semi-conductor Peltier battery in contact with such circulating liquid, while the other of the sides of said battery is insulated from such circulating liquid and maintained at an approximately constant temperature by contact with a separate circulating fluid of constant temperature.

7. Arrangement according to claim 6 wherein said light beam source is an incandescent lamp provided with a condensing lens means, a collecting lens means also being provided, said lamp, condensing lens means, collecting lens means and photo-resistor all being positioned on the same optical axis, said capillary being disposed between said condensing lens means and said collecting lens means on an axis substantially intersecting said optical axis, said thermometer having a graduated scale adjacent said capillary in the vicinity of the portion of the capillary containing the light-absorbing liquid at a height corresponding to the temperature set-point of the thermostat and said photo-resistor being disposed in a central opening of a focussing screen, whereby said lamp illuminates intensively said scale at said set-point and projects onto said screen an enlarged true image of said scale and said capillary in the vicinity of the set-point with the portion of such image corresponding to the set-point being projected precisely upon the photo-resistor disposed in the central opening of said screen such that the illuminated image portion projected on said photo-resistor causes a change in the resistance and in turn in the photo-current of such photo-resistor in terms of corresponding changes in the intensity of the light thereat as influenced by changes in the height of the mercury in the capillary in the immediate vicinity of the set point and the relative increase and decrease of occlusion of such light thereat by the light-absorbing liquid, said change in the photo-current in turn varying correspondingly the grid potential of said multivibrator and the ratio of heating and cooling during each multivibrator impulse.

8. Arrangement according to claim 2 wherein at least two semi-conductor Peltier batteries in cascade arrangement with attendant circulating liquid portions are provided for attaining low temperatures of the circulating liquid thermostat, all of said batteries, save the last, being energized by a constant electric cooling current while the temperature of the heat exchange surface of the last of the batteries is controlled continuously by said switch control means and temperature sensitive element.

9. In a circulating liquid thermostat for maintaining constant temperature control, the improvement which comprises temperature sensing means, energizable heat exchange means for heating and for cooling alternately such circulating liquid, and control means for intermittent periodic activation of said heat exchange means for both heating and cooling during each intermittent period of activation in dependence upon the temperature sensed by said temperature sensing means to vary the ratio of heating time and of cooling time continuously during each intermittent period of activation.

10. In a circulating liquid thermostat for maintaining constant temperature control, the improvement of a Warburg apparatus in combination with a semi-conductor Peltier battery in contact with the circulating liquid and energized intermittently by current first in one direction and then in the opposite direction for alternate cooling and heating of such liquid within extremely narrow limits of deviation from a predetermined set-point temperature, circulating liquid temperature sensing means and variable switch control means also being present to regulate the duration of each period of heating and each period of cooling in dependence upon the temperature of the liquid sensed, the ratio of heating and cooling varying during each switching period of the switch control means in dependence upon the temperature sensed by the temperature sensing means.

11. Arrangement according to claim 5 wherein the light-absorbing liquid is mercury.

References Cited by the Examiner
UNITED STATES PATENTS

| | | | |
|---|---|---|---|
| 2,197,190 | 4/40 | Mott-Smith | 236—1 |
| 2,488,580 | 11/49 | Burleigh | 219—20.41 |
| 2,828,450 | 3/58 | Pinckaers | 219—20.41 |
| 2,922,284 | 1/60 | Danielson | 62—3 |
| 2,947,915 | 8/60 | Patchell | 219—20.41 |
| 2,986,009 | 5/61 | Gaysowski | 62—3 |
| 3,031,855 | 5/62 | Martz | 62—3 |
| 3,107,324 | 10/63 | Wright | 62—3 |
| 3,111,008 | 11/63 | Nelson | 62—3 |
| 3,121,998 | 2/64 | Nagata | 62—3 |

WILLIAM J. WYE, *Primary Examiner.*

ROBERT A. O'LEARY, *Examiner.*